(12) United States Patent
Bouchon

(10) Patent No.: US 8,903,581 B2
(45) Date of Patent: *Dec. 2, 2014

(54) METHOD AND APPARATUS FOR STARTING AN ENGINE IN A HYBRID VEHICLE

(71) Applicant: Conversant Intellectual Property Management Inc., Ottawa (CA)

(72) Inventor: Nicolas Louis Bouchon, Vancouver (CA)

(73) Assignee: Conversant Intellectual Property Management Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/758,019

(22) Filed: Feb. 4, 2013

(65) Prior Publication Data

US 2013/0143715 A1     Jun. 6, 2013

Related U.S. Application Data

(63) Continuation of application No. 11/606,481, filed on Nov. 30, 2006, now Pat. No. 8,387,730.

(51) Int. Cl.
| | |
|---|---|
| *B60W 20/00* | (2006.01) |
| *B60K 6/547* | (2007.10) |
| *B60W 10/08* | (2006.01) |
| *B60K 6/48* | (2007.10) |
| *B60W 10/06* | (2006.01) |
| *B60W 10/02* | (2006.01) |
| *B60W 30/192* | (2012.01) |
| *B60W 10/115* | (2012.01) |

(52) U.S. Cl.
CPC ............... *B60W 20/00* (2013.01); *B60K 6/547* (2013.01); *B60W 10/08* (2013.01); *B60W 2710/025* (2013.01); *Y02T 10/6221* (2013.01); *B60K 6/48* (2013.01); *Y02T 10/6286* (2013.01); *B60W 2510/0695* (2013.01); *B60W 10/06* (2013.01); *B60W 10/02* (2013.01); *B60W 30/192* (2013.01); *B60Y 2300/50* (2013.01); *B60W 10/115* (2013.01)

USPC ..... 701/22; 701/67; 180/65.245; 180/65.275; 180/65.6

(58) Field of Classification Search
USPC .............. 701/22, 51, 67; 180/65.245, 65.275, 180/65.28, 65.6
See application file for complete search history.

(56) References Cited

U.S. PATENT DOCUMENTS

| | | |
|---|---|---|
| 5,713,814 A | 2/1998 | Hara et al. |
| 5,789,881 A | 8/1998 | Egami et al. |

(Continued)

FOREIGN PATENT DOCUMENTS

| | | |
|---|---|---|
| EP | 0922600 A2 | 6/1999 |
| EP | 0729858 B1 | 5/2000 |

(Continued)

OTHER PUBLICATIONS

Bouchon, Nicolas Louis; U.S. Appl. No. 11/606,481, filed Nov. 30, 2006; Title: Method and Apparatus for Starting an Engine in a Hybrid Vehicle.

(Continued)

*Primary Examiner* — Thomas G Black
*Assistant Examiner* — Peter D Nolan
(74) *Attorney, Agent, or Firm* — Conley Rose, P.C.; J. Robert Brown, Jr.

(57) ABSTRACT

A method and apparatus for starting an engine in a hybrid vehicle being driven by an electric motor is disclosed. The motor is operably configured to deliver mechanical power through an automatic transmission to at least one vehicle drive wheel to cause an acceleration of the vehicle. The method involves coupling the engine to the motor to cause an inertial load on the motor thus causing the motor to decelerate to a reduced rotational speed to provide a starting torque to the engine for starting the engine, and causing the automatic transmission to change gear ratio to a target gear ratio associated with the reduced rotational speed while causing the motor to decelerate, the motor being operable to deliver increased torque at the reduced rotational speed, thereby generally maintaining the acceleration of the vehicle.

35 Claims, 5 Drawing Sheets

(56) References Cited

U.S. PATENT DOCUMENTS

| | | | |
|---|---|---|---|
| 5,873,426 A | 2/1999 | Tabata et al. | |
| 5,903,061 A | 5/1999 | Tsuzuki et al. | |
| 6,077,186 A | 6/2000 | Kojima et al. | |
| 6,244,368 B1 | 6/2001 | Ando et al. | |
| 6,543,565 B1* | 4/2003 | Phillips et al. | 180/165 |
| 6,581,705 B2* | 6/2003 | Phillips et al. | 180/65.25 |
| 6,629,026 B1 | 9/2003 | Baraszu et al. | |
| 6,634,986 B2 | 10/2003 | Kima | |
| 6,735,502 B2* | 5/2004 | Phillips et al. | 701/22 |
| 6,994,177 B2 | 2/2006 | Ito et al. | |
| 7,082,930 B2* | 8/2006 | Liller et al. | 123/491 |
| 7,165,638 B2 | 1/2007 | Ito et al. | |
| 7,191,746 B2 | 3/2007 | Nakamura | |
| 7,200,476 B2* | 4/2007 | Cawthorne et al. | 701/51 |
| 7,273,119 B2* | 9/2007 | Tsuneyoshi et al. | 180/65.28 |
| 7,347,803 B2 | 3/2008 | Kobayashi et al. | |
| 7,360,616 B2* | 4/2008 | Schiele | 180/65.265 |
| 7,469,758 B2 | 12/2008 | Iwanaka et al. | |
| 7,493,980 B2* | 2/2009 | Hidaka | 180/65.25 |
| 7,520,353 B2* | 4/2009 | Severinsky et al. | 180/65.28 |
| 7,644,790 B2* | 1/2010 | Roske et al. | 180/65.22 |
| 7,766,107 B2 | 8/2010 | Joe et al. | |
| 7,770,678 B2* | 8/2010 | Nozaki et al. | 180/65.6 |
| 7,874,956 B2 | 1/2011 | Kouno | |
| 7,975,791 B2* | 7/2011 | Nozaki et al. | 180/65.6 |
| 2001/0044683 A1 | 11/2001 | Takaoka et al. | |
| 2002/0117860 A1 | 8/2002 | Man et al. | |
| 2003/0000751 A1 | 1/2003 | Denton et al. | |
| 2003/0173783 A1 | 9/2003 | Berels | |
| 2005/0211479 A1 | 9/2005 | Tamor | |
| 2007/0056783 A1* | 3/2007 | Joe et al. | 180/65.2 |
| 2007/0101965 A1 | 5/2007 | Asahara et al. | |
| 2007/0275818 A1 | 11/2007 | Kouno | |
| 2008/0119975 A1* | 5/2008 | Yamazaki et al. | 701/22 |

FOREIGN PATENT DOCUMENTS

| | | |
|---|---|---|
| EP | 1193101 A1 | 4/2002 |
| JP | 2000220732 A | 8/2000 |
| JP | 4466514 B2 | 5/2010 |
| WO | 2006029878 A1 | 3/2006 |

OTHER PUBLICATIONS

Office Action dated Sep. 16, 2009; U.S. Appl. No. 11/606,481, filed Nov. 30, 2006; 6 pages.

Office Action dated Jan. 19, 2010; U.S. Appl. No. 11/606,481, filed Nov. 30, 2006; 14 pages.

Final Office Action dated Jul. 26, 2010; U.S. Appl. No. 11/606,481, filed Nov. 30, 2006; 12 pages.

Office Action dated Feb. 14, 2011; U.S. Appl. No. 11/606,481, filed Nov. 30, 2006; 15 pages.

Final Office Action dated Aug. 1, 2011; U.S. Appl. No. 11/606,481, filed Nov. 30, 2006; 18 pages.

Office Action dated Apr. 17, 2012; U.S. Appl. No. 11/606,481, filed Nov. 30, 2006; 11 pages.

Notice of Allowance dated Oct. 31, 2012; U.S. Appl. No. 11/606,481, filed Nov. 30, 2006; 14 pages.

PCT International Search Report; Application No. PCT/CA2007/002354; Sep. 4, 2008; 2 pages.

PCT Written Opinion of the International Searching Authority; Application No. PCT/CA2007/002354; Sep. 4, 2008; 5 pages.

PCT International Preliminary Report on Patentability; Application No. PCT/CA2007/002354; Jun. 15, 2010; 6 pages.

* cited by examiner

METHOD AND APPARATUS FOR STARTING AN ENGINE IN A HYBRID VEHICLE

RELATED APPLICATIONS

This application is a continuation application of U.S. patent application Ser. No. 11/606,481, filed Nov. 30, 2006, under 35 U.S.C. §§119, 120, 363, 365, and 37 C.F.R. §1.55 and §1.78, which is incorporated herein by this reference.

FIELD OF INVENTION

This invention relates generally to hybrid vehicles and more particularly to starting an engine in a hybrid vehicle.

BACKGROUND OF THE INVENTION

Hybrid electric vehicles having an engine (such as an internal combustion engine) and an electric motor, for providing power to the vehicle have become a viable alternative to conventional internal combustion engine vehicles. While such vehicles may require more complex power transmission components, this complexity is offset by improved fuel consumption and a corresponding reduction in pollutant emissions from the engine.

Given the present climate of higher prices for fossil fuels, there is a corresponding desire to further reduce fuel consumption costs when operating hybrid vehicles. Hybrid electrical vehicles reduce fuel consumption by apportioning the power required to operate the vehicle between the engine and electric motor, to cause these components to operate at efficient operating points. For example, when moving slowly or when starting off from a stationary position, the electric motor may be considerably more efficient than the engine and in this case most of the power may be supplied by the motor. Engines generally operate more efficiently at higher rotational speeds and accordingly, at higher vehicle velocity a greater proportion of power may be supplied by the engine. When moving slowly, it may thus be desirable to supply all of the necessary operating torque from the motor, while the engine remains stopped, thus reducing fuel consumption and emissions.

In some hybrid vehicles, the electric motor is coupled to the engine and may be used to start the engine, thus eliminating the need for a separate electric starter motor, as found in conventional internal combustion engine vehicles. When the vehicle operates under conditions that require torque to be supplied from the engine, the motor may be mechanically coupled to the engine to provide a starting torque thereto. The diversion of torque from the vehicle wheels to the engine while starting the engine may result in undesirable acceleration changes.

There remains a need for improved methods and apparatus for starting engines in hybrid vehicles.

BRIEF SUMMARY OF THE INVENTION

In accordance with one aspect of the invention there is provided a method for starting an engine in a hybrid vehicle being driven by an electric motor, the motor being operably configured to deliver mechanical power through an automatic transmission to at least one vehicle drive wheel to cause an acceleration of the vehicle. The method involves coupling the engine to the motor to cause an inertial load on the motor thus causing the motor to decelerate to a reduced rotational speed to provide a starting torque to the engine for starting the engine, and causing the automatic transmission to change gear ratio to a target gear ratio associated with the reduced rotational speed while causing the motor to decelerate, the motor being operable to deliver increased torque at the reduced rotational speed, thereby generally maintaining the acceleration of the vehicle.

Coupling the engine may involve coupling the engine to the motor when a vehicle operating condition meets a criterion for starting the engine.

Causing the automatic transmission to change gear ratio may involve causing the automatic transmission to change gear ratio to the target gear ratio when the vehicle operating condition meets the criterion for starting the engine.

Coupling the engine to the motor when the vehicle operating condition meets the criterion for starting the engine may involve coupling the engine to the motor when at least one of the motor speed reaches a reference speed, the vehicle reaches a reference velocity, a storage element for supplying electrical energy to the motor reaches a reference minimum state of charge, and a voltage at which the electrical energy may be supplied to the motor reaches a reference minimum level.

Causing the engine to be mechanically coupled to the motor may involve causing a clutch between the motor and the engine to be engaged to transmit the starting torque to the engine.

The method may involve producing a clutch control signal when a vehicle operating condition meets a criterion for starting the engine, the clutch having a disengaged state operable to decouple the engine from the motor and an engaged state operable to couple the engine to the motor, and the clutch may be operably configured to change from the disengaged state to the engaged state in response to the clutch control signal.

Producing the clutch control signal may involve producing a discrete clutch control signal having first and second states, the clutch being operably configured to change from the disengaged state to the engaged state in response to the clutch control signal having the first state.

Producing the clutch control signal may involve producing a clutch control signal having a time-varying amplitude representing a desired amount of engagement of the clutch between the engaged state and the disengaged state, the clutch being responsive to the clutch control signal to control an amount of slippage of the clutch when coupling the engine to the motor.

The method may involve producing a transmission shift signal in response to the vehicle operating condition meeting the criterion for starting the engine, and causing the automatic transmission to change gear ratio may involve causing the automatic transmission to change gear ratio to the target gear ratio in response to the transmission shift signal.

Producing the clutch control signal may involve producing the clutch control signal a first time period after the vehicle operating condition meets the criterion for starting the engine, and producing the transmission shift signal may involve producing the transmission shift signal a second time period after the vehicle operating condition meets the criterion for starting the engine, the first and second time periods being selected such that a substantially constant acceleration of the vehicle may be maintained while starting the engine.

The method may involve producing an engine start signal in response to the vehicle operating condition meeting the criterion for starting the engine.

Producing the engine start signal may involve producing at least one of an ignition signal for controlling ignition of the engine, and a fuel control signal for causing fuel to be supplied to the engine.

Producing the engine start signal may involve producing the engine start signal a third time period after the vehicle operating condition meets the criterion for starting the engine, the third time period being sufficient time to permit the engine to reach a rotational speed that generally matches the rotational speed of the motor.

The automatic transmission may be operably configured to provide a plurality of discrete gear ratios and causing the automatic transmission to change the gear ratio may involve causing the automatic transmission to change gear ratio from a first gear ratio to the target gear ratio.

The automatic transmission may be operably configured to provide a continuously variable gear ratio and causing the automatic transmission to change the gear ratio may involve causing the automatic transmission to change gear ratio by an amount sufficient to provide the target gear ratio between the motor and the at least one drive wheel.

In accordance with another aspect of the invention there is provided an apparatus for starting an engine in a hybrid vehicle being driven by an electric motor, the motor being operably configured to deliver mechanical power through an automatic transmission to at least one vehicle drive wheel to cause an acceleration of the vehicle. The apparatus includes provisions for coupling the engine to the motor to cause an inertial load on the motor thus causing the motor to decelerate to a reduced rotational speed to provide a starting torque to the engine for starting the engine, and provisions for causing the automatic transmission to change gear ratio to a target gear ratio associated with the reduced rotational speed while causing the motor to decelerate, the motor being operable to deliver increased torque at the reduced rotational speed, thereby generally maintaining the acceleration of the vehicle.

The provisions for coupling the engine may include provisions for coupling the engine to the motor when a vehicle operating condition meets a criterion for starting the engine.

The provisions for causing the automatic transmission to change gear ratio may include provisions for causing the automatic transmission to change gear ratio to the target gear ratio when the vehicle operating condition meets the criterion for starting the engine.

The provisions for coupling the engine to the motor when the vehicle operating condition meets the criterion for starting the engine may include provisions for coupling the engine to the motor when at least one of the motor speed reaches a reference speed, the vehicle reaches a reference velocity, a storage element for supplying electrical energy to the motor reaches a reference minimum state of charge, and a voltage at which the electrical energy may be supplied to the motor reaches a reference minimum level.

The provisions for causing the engine to be mechanically coupled to the motor may include causing a clutch between the motor and the engine to be engaged to transmit the starting torque to the engine.

The apparatus may include provisions for producing a clutch control signal when a vehicle operating condition meets a criterion for starting the engine, the clutch having a disengaged state operable to decouple the engine from the motor and an engaged state operable to couple the engine to the motor, and the clutch may be operably configured to change from the disengaged state to the engaged state in response to the clutch control signal.

The provisions for producing the clutch control signal may include provisions for producing a discrete clutch control signal having first and second states, the clutch being operably configured to change from the disengaged state to the engaged state in response to the clutch control signal having the first state.

The provisions for producing the clutch control signal may include provisions for producing a clutch control signal having a time-varying amplitude representing a desired amount of engagement of the clutch between the engaged state and the disengaged state, the clutch being responsive to the clutch control signal to control an amount of slippage of the clutch when coupling the engine to the motor.

The apparatus may include provisions for producing a transmission shift signal in response to the vehicle operating condition meeting the criterion for starting the engine, and the provisions for causing the automatic transmission to change gear ratio may include provisions for causing the automatic transmission to change gear ratio to the target gear ratio in response to the transmission shift signal.

The provisions for producing the clutch control signal may include provisions for producing the clutch control signal a first time period after the vehicle operating condition meets the criterion for starting the engine, and the provisions for producing the transmission shift signal may include provisions for producing the transmission shift signal a second time period after the vehicle operating condition meets the criterion for starting the engine, the first and second time periods being selected such that a substantially constant acceleration of the vehicle may be maintained while starting the engine.

The apparatus may include provisions for producing an engine start signal in response to the vehicle operating condition meeting the criterion for starting the engine.

The provisions for producing the engine start signal may include provisions for producing at least one of an ignition signal for controlling ignition of the engine, and a fuel control signal for causing fuel to be supplied to the engine.

The provisions for producing the engine start signal may include provisions for producing the engine start signal a third time period after the vehicle operating condition meets the criterion for starting the engine, the third time period being sufficient time to permit the engine to reach a rotational speed that generally matches the rotational speed of the motor.

The automatic transmission may be operably configured to provide a plurality of discrete gear ratios and the provisions for causing the automatic transmission to change the gear ratio may include provisions for causing the automatic transmission to change gear ratio from a first gear ratio to the target gear ratio.

The automatic transmission may be operably configured to provide a continuously variable gear ratio and the provisions for causing the automatic transmission to change the gear ratio may include provisions for causing the automatic transmission to change gear ratio by an amount sufficient to provide the target gear ratio between the motor and the at least one drive wheel.

In accordance with another aspect of the invention there is provided an apparatus for starting an engine in a hybrid vehicle being driven by an electric motor, the motor being operably configured to deliver mechanical power through an automatic transmission to at least one vehicle drive wheel to cause an acceleration of the vehicle. The apparatus includes a controller operably configured to cause the engine to be coupled to the motor to cause an inertial load on the motor thus causing the motor to decelerate to a reduced rotational speed to provide a starting torque to the engine for starting the engine, and cause the automatic transmission to change gear ratio to a target gear ratio associated with the reduced rotational speed while causing the motor to decelerate, the motor being operable to deliver increased torque at the reduced rotational speed, thereby generally maintaining the acceleration of the vehicle.

The controller may be operably configured to couple the engine to the motor when a vehicle operating condition meets a criterion for starting the engine.

The controller may be operably configured to cause the automatic transmission to change gear ratio to the target gear ratio when the vehicle operating condition meets the criterion for starting the engine.

The controller may be operably configured to couple the engine to the motor when at least one of the motor speed reaches a reference speed, the vehicle reaches a reference velocity, a storage element for supplying electrical energy to the motor reaches a reference minimum state of charge, and a voltage at which the electrical energy may be supplied to the motor reaches a reference minimum level.

The controller may be operably configured to cause a clutch between the motor and the engine to be engaged to transmit the starting torque to the engine.

The controller may be operably configured to produce a clutch control signal when a vehicle operating condition meets a criterion for starting the engine, the clutch having a disengaged state operable to decouple the engine from the motor and an engaged state operable to couple the engine to the motor, and the clutch may be operably configured to change from the disengaged state to the engaged state in response to the clutch control signal.

The controller may be operably configured to produce a discrete clutch control signal having first and second states, the clutch being operably configured to change from the disengaged state to the engaged state in response to the clutch control signal having the first state.

The controller may be operably configured to produce a clutch control signal having a time-varying amplitude representing a desired amount of engagement of the clutch between the engaged state and the disengaged state, the clutch being responsive to the clutch control signal to control an amount of slippage of the clutch when coupling the engine to the motor.

The controller may be operably configured to produce a transmission shift signal in response to the vehicle operating condition meeting the criterion for starting the engine, and the controller may be operably configured to cause the automatic transmission to change gear ratio to the target gear ratio in response to the transmission shift signal.

The controller may be operably configured to produce the clutch control signal a first time period after the vehicle operating condition meets the criterion for starting the engine, and the controller may be operably configured to produce the transmission shift signal a second time period after the vehicle operating condition meets the criterion for starting the engine, the first and second time periods being selected such that a substantially constant acceleration of the vehicle may be maintained while starting the engine.

The controller may be operably configured to produce an engine start signal in response to the vehicle operating condition meeting the criterion for starting the engine.

The controller may be operably configured to produce at least one of an ignition signal for controlling ignition of the engine, and a fuel control signal for causing fuel to be supplied to the engine.

The controller may be operably configured to produce the engine start signal a third time period after the vehicle operating condition meets the criterion for starting the engine, the third time period being sufficient time to permit the engine to reach a rotational speed that generally matches the rotational speed of the motor.

The automatic transmission may be operably configured to provide a plurality of discrete gear ratios and the controller may be operably configured to cause the automatic transmission to change gear ratio from a first gear ratio to the target gear ratio.

The automatic transmission may be operably configured to provide a continuously variable gear ratio and the controller may be operably configured to cause the automatic transmission to change gear ratio by an amount sufficient to provide the target gear ratio between the motor and the at least one drive wheel.

Other aspects and features of the present invention will become apparent to those ordinarily skilled in the art upon review of the following description of specific embodiments of the invention in conjunction with the accompanying figures.

BRIEF DESCRIPTION OF THE SEVERAL VIEWS OF THE DRAWINGS

In drawings which illustrate embodiments of the invention.

DETAILED DESCRIPTION OF THE INVENTION

Figure 1:
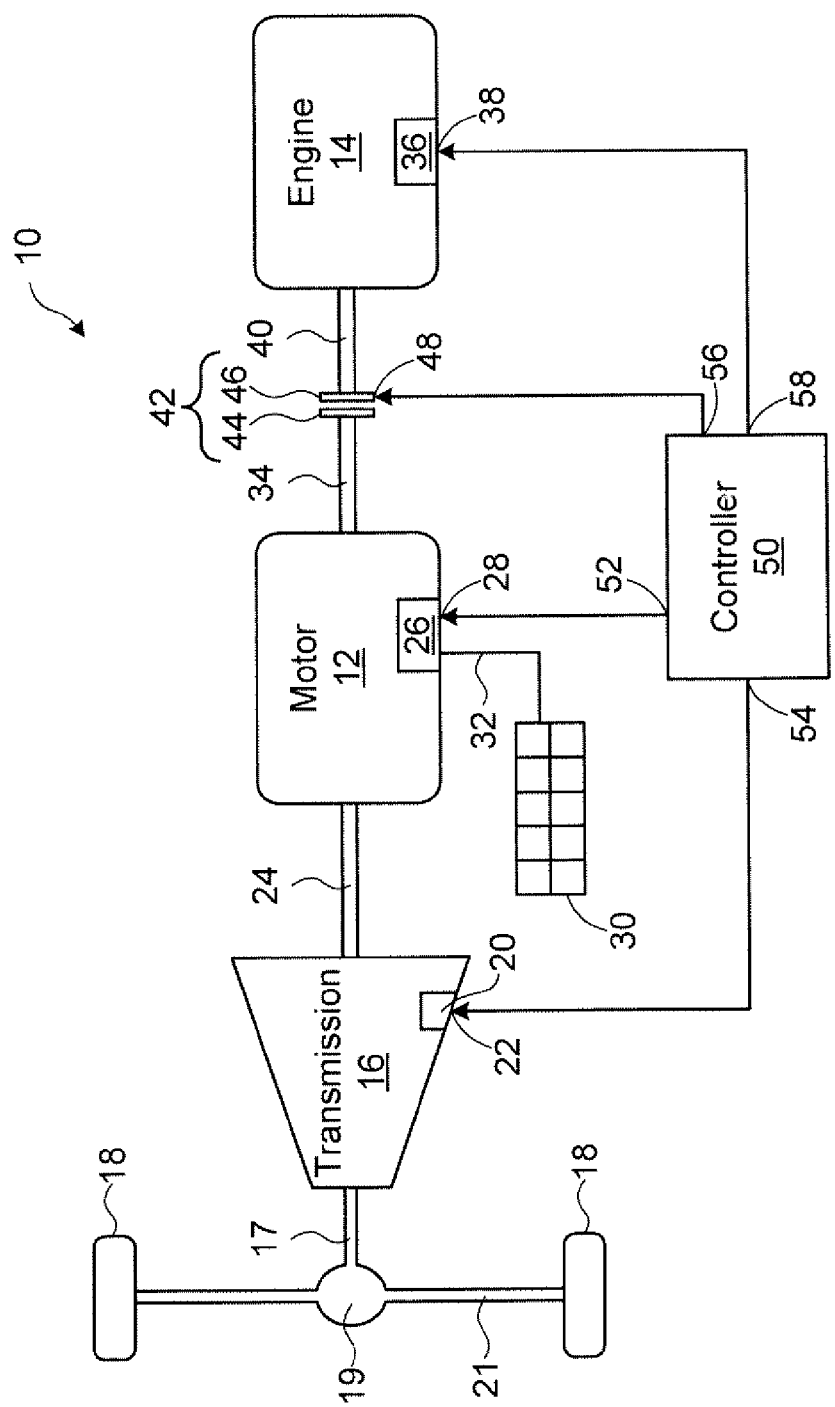
FIG. 1 is a schematic view of a hybrid vehicle in accordance with a first embodiment of the invention.

Referring to FIG. 1, a hybrid vehicle according to a first embodiment of the invention is shown generally at 10. The hybrid vehicle 10 includes an electric motor 12, an engine 14, an automatic transmission 16, and a pair of drive wheels 18.

The automatic transmission 16 is mechanically coupled to the drive wheels 18 through a transmission output shaft 17, a differential 19, and a drive axle 21. The automatic transmission 16 includes an interface 20 having an input 22 for receiving a shift signal for causing the automatic transmission to change gear ratio. The automatic transmission 16 may comprise a conventional automatic transmission having a plurality of gears (not shown), which may be configured to provide a plurality of discrete gear ratios between the first shaft 24 and the transmission output shaft 17. Alternatively, the automatic transmission 16 may include a continuously variable transmission that is responsive the shift signal to provide gear ratios within a range of gear ratios that the automatic transmission is capable of producing. In other embodiments the automatic transmission 16 may comprise an auto-shifted manual transmission, which includes a gear configuration similar to conventional manual transmissions, but further includes an automatic clutch and actuators for automatically shifting gear configuration.

The motor 12 is mechanically coupled to the automatic transmission 16 by a first shaft 24, which couples mechanical power generated by the motor 12 to the automatic transmission for driving the wheels 18 of the vehicle. The motor 12 may comprise an alternating current (AC) induction motor, a brushless direct current (DC) motor, or any other electric motor suitable for driving the vehicle 10.

The motor 12 includes an interface 26, which is electrically coupled to an energy bus 32 for receiving electrical energy to generate the mechanical power at the first shaft 24. The interface 26 also includes an input 28 for receiving a motor control signal for controlling an amount of power generated by the motor 12.

The hybrid vehicle 10 further includes an energy storage element 30, which is electrically coupled to the energy bus 32, for providing electrical energy to the motor in order to generate mechanical power. The storage element may include a plurality of battery cells, such as nickel metal hydride cells. Alternatively the storage element may include an ultra-capacitor, or a combination of battery cells and an ultra-capacitor, for example.

In general, the storage element produces a direct current (DC) on the energy bus 32. The interface 26 of the motor 12 receives the DC current and controls a current and/or voltage supplied to the motor in response to the motor control signal received at the input 28 to cause the motor to generate mechanical power at the first shaft 24 at a suitable torque and rotational speed for operating the vehicle.

In embodiments where the motor 12 is an AC induction motor or a brushless DC motor, the interface 26 may include an inverter for converting the direct current produced by the storage element 30 into an alternating current suitable for driving such motors.

The motor 12 is also mechanically coupled to a second shaft 34. In general the motor includes a rotor element (not shown), which has mechanical couplings (not shown) at each end for coupling to the first shaft 24 and to the second shaft 34, such that the rotor, the first shaft, and the second shaft all rotate together as a unit.

The engine 14 is mechanically coupled to a third shaft 40, and is operable to generate a torque on the third shaft by combustion of a fuel source (not shown). The engine 14 may be any type of internal or external combustion engine, e.g. Otto, Atkinson, and diesel cycle engines, Stirling engines, gas turbine engines, etc. The engine 14 may run on a fuel such as gasoline, diesel, biogas, or other bio-fuels including cellulosic and other ethanols, propane etc.

The engine 14 includes an interface 36 having an input 38 for receiving an engine start signal, for causing the engine to start. Depending on the type of engine 14, the start signal may include a plurality of signals. For example, in a gasoline engine, the start signal may include a fuel signal for controlling fuel delivered to the engine, and an ignition signal for causing firing of spark plugs.

In the embodiment shown, the hybrid vehicle 10 also includes a clutch 42 for mechanically coupling torque from the engine 14 to the second shaft 34, or from the second shaft to the engine. The clutch 42 includes a first friction disk 44, which is mechanically coupled to the third shaft 40, and the second friction disk 46, which is mechanically coupled to the motor 12 by the second shaft 34. The clutch 42 is engaged by causing the friction disks 44 and 46 to be brought into contact with each other, and the clutch is disengaged by causing the friction disks to be separated (as shown in FIG. 1).

The clutch 42 also includes an input 48 for receiving a clutch control signal for controlling a state of engagement of the clutch. The clutch control signal may have two states, including a first state representing an engaged state of the clutch, and a second state representing a disengaged state of the clutch. Alternatively, the clutch control signal may have time-varying amplitude values representing an instantaneous desired amount of engagement of the clutch between a fully engaged state and a fully disengaged state, such that the clutch 42 may be engaged in such a manner as to control an amount of slippage when mechanically coupling the engine 14 to the motor 12.

In the embodiment shown in FIG. 1, the clutch 42 includes two friction disks 44 and 46, however in other embodiments (not shown) the clutch may include a plurality of interleaved friction disks having increased area of contact between the disks for transmitting higher torque.

In some embodiments the motor 12 may be capable of operating in a generator mode, in which case the motor receives a torque on the first shaft 24 or on the second shaft 34, and produces electrical energy on the energy bus 32 for charging the storage element 30. The torque for producing electrical energy in the generator mode may be produced when the vehicle 10 is maintaining or reducing speed, in which case the kinetic energy of the vehicle is transferred to the drive wheels 18 acting on a road surface, through the automatic transmission 16, and to the first shaft 24. Alternatively, the torque for producing electrical energy in the generator mode may be produced by the engine and transferred through the clutch 42 (when the clutch is engaged) to the second shaft 34.

The hybrid vehicle 10 further includes a controller 50 for controlling starting of the engine 14. The controller 50 has a first output 52 for producing the motor control signal, a second output 54 for producing the shift signal, a third output 56 for producing the clutch control signal, and a fourth output 58 for producing the engine start signal.

In the embodiment shown in FIG. 1, the hybrid vehicle 10 is shown as having a pair of drive wheels 18. However, it should be readily appreciated that in other embodiments, drive power may be coupled to all four wheels (or more wheels if provided), or to a single wheel (in the case of a motorcycle or three-wheeled vehicle, for example).

Figure 2:
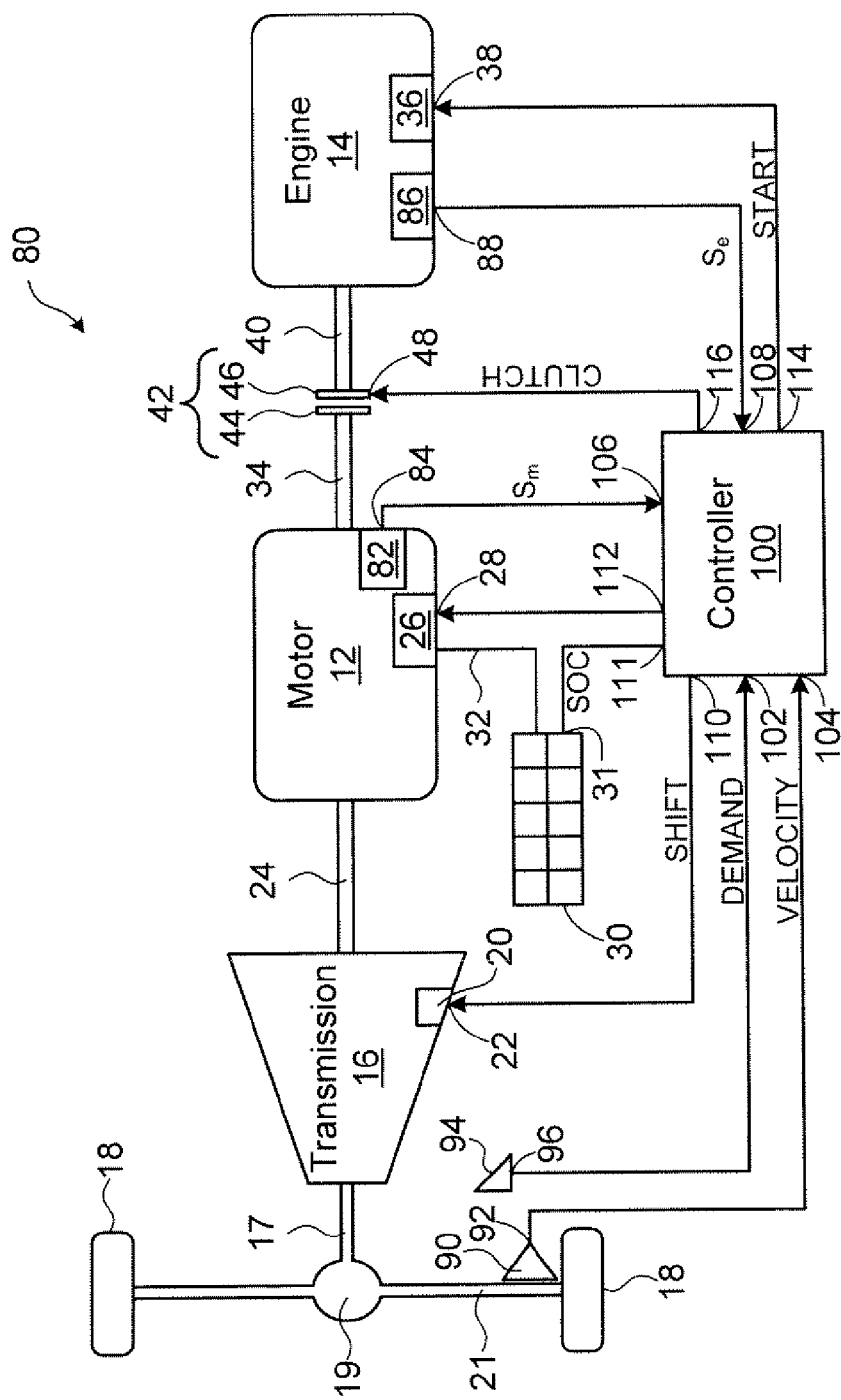
FIG. 2 is a schematic view of a hybrid vehicle in accordance with a second embodiment of the invention.

Referring to FIG. 2, a second embodiment of a hybrid vehicle is shown generally at 80. The hybrid vehicle 80 includes the motor 12, the engine 14, the automatic transmission 16, and the energy storage element 30, generally as shown in FIG. 1.

The motor 12, in this embodiment, further includes a speed sensor 82 having an output 84 for producing a motor speed signal ($S_m$) representing a rotational speed of the motor.

The engine 14 further includes a speed sensor 86 having an output 88 for producing an engine speed signal ($S_e$) representing a rotational speed of the engine.

The hybrid vehicle 80 further includes a velocity sensor 90 having an output 92 for producing a vehicle velocity signal representing a velocity of the vehicle. In general the velocity sensor 90 may be mechanically, optically, or magnetically coupled to the axle 21 or one of the drive wheels 18 and the velocity sensor 90 may further include circuitry for converting a sensed rotational speed of the wheels 18 or axle 21 into a vehicle velocity signal. Alternatively, the velocity sensor 90 may be mechanically, optically, or magnetically coupled to the transmission output shaft 17.

The hybrid vehicle 80 further includes an operator input device 94 having an output 96 for producing a demand signal. The operator input device 94 may include a foot pedal disposed in a driving compartment (not shown) of the hybrid vehicle 80, which is configured to produce the demand signal in response to an operator depressing the pedal, for example.

In this embodiment, the storage element 30 includes an output 31 for producing a state of charge (SOC) signal representing a charge level of the storage element.

The hybrid vehicle 80 also includes a controller 100, which in this embodiment includes a first input 102 for receiving the demand signal, a second input 104 for receiving the velocity signal, a third input 106 for receiving the motor speed signal $S_m$, a fourth input 108 for receiving the engine speed signal $S_e$, and a fifth input 111 for receiving the state of charge signal from the storage element 30.

The controller 100 also includes a first output 110 for producing the shift signal, a second output 112 for producing the motor control signal, a third output 114 for producing the engine start signal, and a fourth output 116 for producing the clutch control signal.

Figure 3:
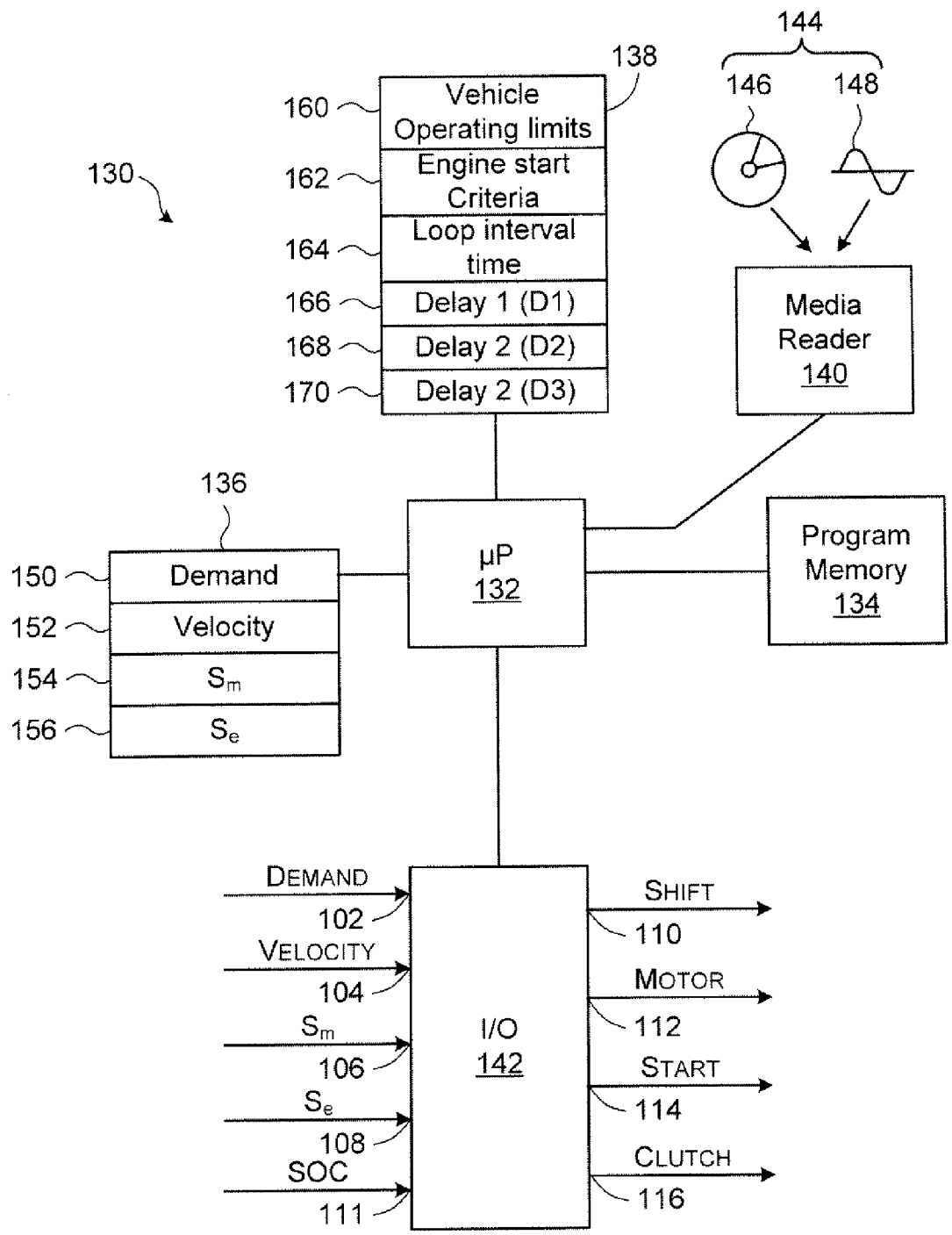
FIG. 3 is a schematic view of a processor circuit for implementing a controller for the hybrid vehicle shown in FIG. 2.

Referring to FIG. 3, in one embodiment the controller 100 may be implemented using a processor circuit shown generally at 130. The processor circuit 130 includes a microprocessor 132, a program memory 134, a variable memory 136, a parameter memory 138, a media reader 140, and an input output port (I/O) 142, all of which are in communication with the microprocessor 132.

The I/O 142 includes the first input 102 for receiving the demand signal, the second input 104 for receiving the vehicle velocity signal, the third input 106 for receiving the motor speed signal, the fourth input 108 for receiving the engine speed signal, and the fifth input for receiving the state of charge signal from the storage element 30. The I/O 142 further includes the first output 110 for producing the shift signal, the second output 112 for producing the motor control signal, the third output 114 for producing the start signal, and the fourth output 116 for producing the clutch control signal.

Program codes for directing the microprocessor 132 to carry out various functions are stored in the program memory 134, which may be implemented as a random access memory (RAM) and/or a hard disk drive (HDD), or a combination thereof.

The media reader 140 facilitates loading program codes into the program memory 134 from a computer readable medium 144, such as a CD ROM disk 146, or a computer readable signal 148, such as may be received over a network such as a controller area network (CAN), which may be implemented in the vehicle, for example.

The variable memory 136 includes a plurality of storage locations including a store 150 for storing a value of the demand signal, a store 152 for storing a value of the vehicle velocity signal, a store 154 for storing a value of the motor speed $S_m$, and a store 156 for storing a value of the engine speed signal $S_e$. The variable memory 136 may be implemented in random access memory, for example.

The parameter memory 138 includes a plurality of storage locations, including a store 160 for storing values representing vehicle operating limits, a store 162 for storing engine start criteria, a store 164 for storing a value of a loop interval time, and stores 166, 168, and 170 for storing values of reference delay times D1, D2, and D3. The parameter memory 138 may be implemented in random access memory, for example.

In other embodiments (not shown), the controller 100 may be partly or fully implemented using a hardware logic circuit including discrete logic circuits and/or an application specific integrated circuit (ASIC).

Referring to FIG. 1, operating power for driving the vehicle 10 is supplied to the drive wheels 18 through the automatic transmission 16. When the clutch control signal is in the disengaged state, the clutch 42 decouples the engine from the second shaft 34. The motor 12 receives electrical energy from the storage element 30 on the energy bus 32, and the motor generates mechanical power which is mechanically coupled to the transmission 16 by the first shaft 24. Advantageously, when the clutch 42 is in the disengaged state, the engine 14 is stopped to reduce fuel consumption and to curtail emissions of pollutants due to combustion of fuel.

In general, the controller 50 is operably configured to produce a motor control signal at the first output 52, which causes the motor 12 to generate mechanical power at a suitable torque and rotational speed for accelerating the vehicle 10.

The controller 50 is further configured to cause the engine 14 to be mechanically coupled to the motor 12 by producing a clutch control signal at the second output 56. The clutch control signal causes the clutch 42 to couple the engine 14 to the motor 12 such that the motor is decelerated from a first rotational speed to a second rotational speed. The deceleration of the motor 12 is operable to generate a starting torque for starting the engine 14.

The controller 50 also produces a transmission shift signal at the second output 54 for causing the automatic transmission 16 to change gear ratio from a first gear ratio to a second gear ratio while the motor 12 is being decelerated. The motor 12 generates increased torque at the second rotational speed such that the mechanical power coupled to the drive wheels 18 at the second gear ratio remains generally constant while starting the engine 14, thus maintaining the acceleration of the vehicle 10.

The controller 50 also produces an engine start signal at the fourth output 58 for starting the engine 14 when the torque received from the decelerating motor causes the engine to reach sufficient rotational speed for starting the engine.

The operation of the hybrid vehicle is described in greater detail with reference to FIGS. 2-5.

Figure 4:
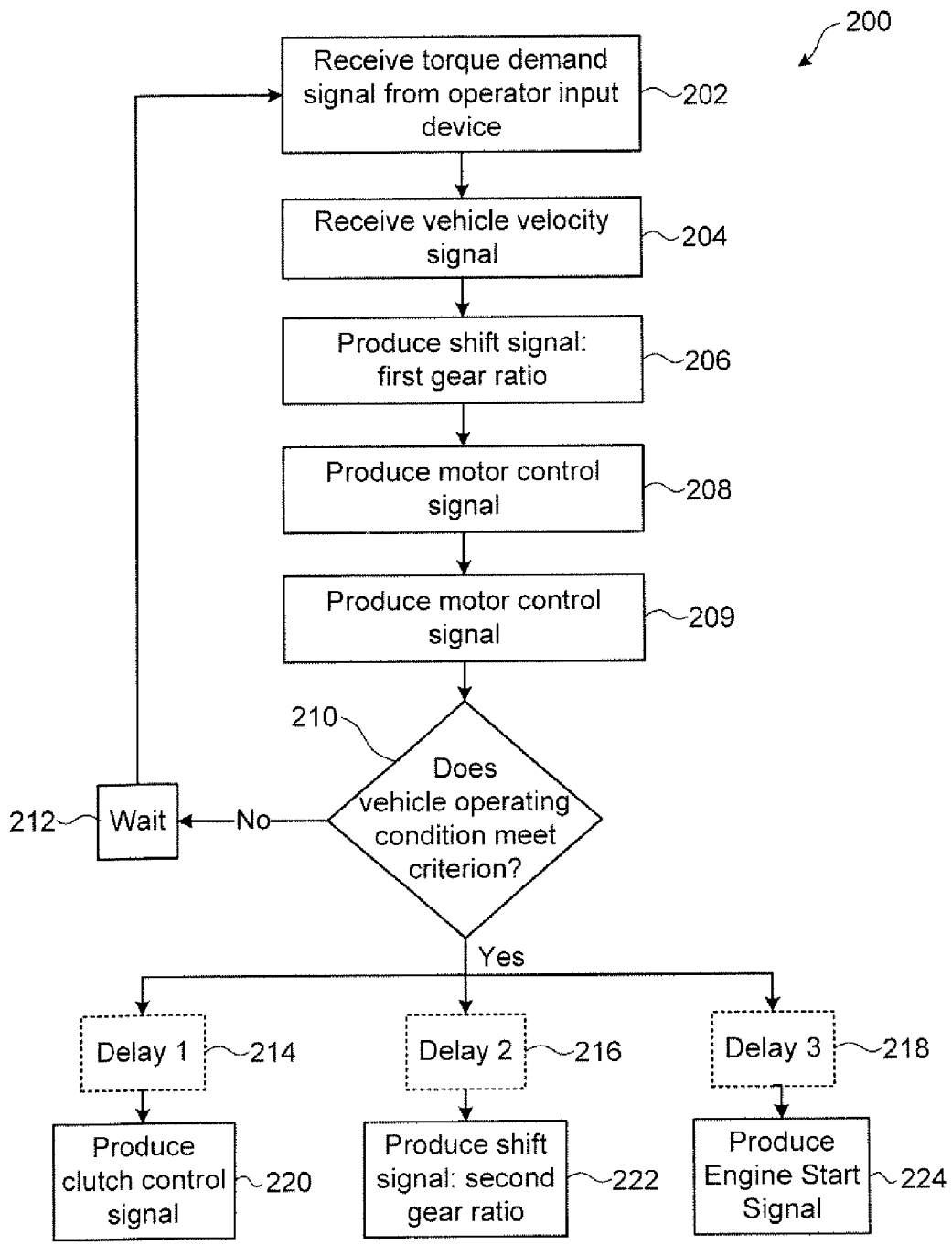
FIG. 4 is a flowchart depicting blocks of code for carrying out a method for starting an engine of the hybrid vehicle shown in FIG. 2.

Referring to FIG. 4, a flowchart depicting blocks of code for directing the processor circuit 130 to cause the engine 14 to be started is shown generally at 200. The process 200 starts with the clutch 42 in the disengaged state, the engine 14 stopped, and the vehicle 80 in a stationary state or moving at a low velocity. The blocks generally represent codes that may be read from the computer readable medium 144, and stored in the program memory 134, for directing the microprocessor 132 to perform various functions related to starting the engine 14. The actual code to implement each block may be written in any suitable program language, such as C, C++, and/or assembly code, for example.

A first block of codes 202 directs the microprocessor 132 to cause the I/O 142 to receive the demand signal from the operator input device 94 at the first input 102 and to store a value of the demand signal in the store 150 of the variable memory 136.

Block 204 directs the microprocessor 132 to cause the I/O to receive the velocity signal at the second input 104 and to store a value of the velocity signal in the store 152 of the variable memory 136.

Block 206 directs the microprocessor 132 to cause the I/O 142 to read the velocity value from the store 152, and to produce the shift signal at the first output 110, having a state representing a first gear ratio of the automatic transmission 16 suitable for accelerating the vehicle from the current vehicle velocity. The automatic transmission 16 receives the shift signal at the input 22 of the interface 20 and responds by configuring the transmission to provide the first gear ratio. In embodiments where the automatic transmission 16 is a conventional automatic transmission, the transmission includes a plurality of electrical solenoids which are activated by the interface 20 to configure the gears to produce a desired gear ratio, for example.

Block 208 then directs the microprocessor 132 to read the demand signal value from the store 150, and the vehicle operating limits from the store 160, and to compute a motor control signal value. The motor control signal value represents a torque demand within the safe operating limits for the vehicle 80 and the motor 12 that will at least partially satisfy the operator demand. The operating limits may include, for example, a current state of charge of the storage element 30, a maximum motor current, maximum motor torque, etc.

Block 206 then directs the microprocessor 132 to produce a motor demand signal at the second output 112.

The motor demand signal is received at the input 28 of the motor interface 26, and the interface causes the motor 12 to generate a torque in response by causing electrical energy from the storage element 30 to be supplied to the motor on the energy bus 32. The torque is mechanically coupled through the first shaft 24, through the transmission 16, and to the drive wheels 18, thus causing the vehicle 80 to accelerate.

Block 209 then directs the microprocessor 132 to cause the motor speed signal $S_m$ to be received at the third input 106, and stored in the store 154 of the variable memory 136, and the engine speed signal $S_e$ to be received at the fourth input 108, and stored in the store 156 of the variable memory 136.

Block 210 then directs the microprocessor 132 to read the vehicle velocity v from the store 152, and the motor speed $S_m$ from the store 154, and the engine speed $S_e$ from the store 156, and to compare v, $S_m$, and $S_e$ to the engine start criteria stored in the store 162 in the parameter memory 138. The engine start criteria may be expressed follows:

$$\text{Engine Start Criteria}=f(v, S_m, S_c, \text{Other Operating Conditions}) \qquad \text{Eqn 1}$$

where other operating conditions may include operating conditions such as a fuel economy target, a voltage on the energy bus 32, and storage element state of charge, for example.

If at block 210, the vehicle operating condition does not meet the engine start criteria, then the process continues at block 212, which directs the microprocessor 132 to read the loop interval time from the store 164 in the parameter memory 138 and to wait until the loop interval time expires before returning to block 202. Blocks 202 to 210 are thus repeated at a fixed time interval equal to the loop interval time. For example, the loop time interval may be 10 milliseconds and the blocks 202 to 210 may be executed in 5 milliseconds in which case the wait time at block 212 is 5 milliseconds such that the process returns to block 202 every 10 milliseconds until the condition at block 210 is met. At each repetition of block 202, the demand signal from the operator input device 94 may have changed, which may cause a change in the motor control signal at block 208. In some embodiments, when accelerating the vehicle, the processor circuit 130 may cause the transmission 16 to change gear ratio even though the operating condition has not been met at block 210. In such cases the transmission 16 will be configured to provide a second gear ratio for continuing acceleration of the vehicle. In general, the transmission 16 may be caused to change gear ratio several times before the vehicle operating condition meets the criterion, depending on the size of the vehicle 80 and the number gear ratios provided by the transmission 16.

If at block 210, the vehicle operating condition meets the engine start criteria then the process continues at blocks 214, 216, and 218, which optionally direct the microprocessor 132 to read the reference delay times "D1", "D2", and "D3" from the stores 166, 168, and 170 respectively, and to wait for a period of time equal to the respective delay times, before the process continues at blocks 220, 222, and 224 respectively. Accordingly, blocks 220, 222, and 224 may be executed simultaneously if the reference delays D1, D2, and D3 are equal or set to zero. Alternatively if the reference delays D1, D2, and D3 have different values, the blocks 220, 222, and 224 may be executed at times that are staggered in time with respect to each other. In general the delays D1, D2, and D3 will be dependent on a latency time between producing the clutch, shift and engine start control signals and the respective actions taking place. The delays D1, D2, and D3 may further be dependent on a desired delay between the respective actions to cause an even acceleration of the vehicle 80 while starting the engine 14, for example.

Block 220 directs the microprocessor 132 to cause the I/O 142 to produce the clutch control signal at the output 116, to cause the engine 14 to be mechanically coupled to the second shaft 34 and thus to the motor 12. The engine 14 loads the motor 12 causing it to decelerate from a first rotational speed to a second rotational speed due to the increased inertial load imposed by the engine. The deceleration causes rotational kinetic energy of the motor 12 to be coupled into through the clutch 42 to the engine for starting the engine. The torque available may be calculated from the following relation:

$$\tau_s = I\alpha \qquad \text{Eqn 2}$$

where $\tau_s$ is the torque available for starting the engine, I is the inertia of the rotating mass of the motor 12 (i.e. the mass of rotor and coupled shafts), and $\alpha$ is the rotational deceleration of the motor when mechanically coupling the engine 14 to the motor.

While the motor 12 is decelerating, block 222 directs the microprocessor 132 to cause the I/O 142 to produce the shift signal at the first output 110 to cause the transmission 16 to change gear ratio from the first gear ratio to a second gear ratio. In general, an electric motor, such as the motor 12, is capable of producing greatest torque at lower rotational speeds, and thus the change in gear ratio causes increased generation of torque by the motor at the second rotational speed of the motor. In general, when a constant electrical power is being supplied to the motor 12, the mechanical power produced will also be substantially constant. The mechanical power may be written as:

$$P_m = \tau_d s_m \qquad \text{Eqn 3}$$

where $P_m$ is the mechanical power supplied to the first shaft 24 (and hence to the drive wheels 18 through the transmission 16), $\tau_d$ is the torque on the first shaft 24, and $s_m$ is the rotational speed of the motor.

Block 224 directs the microprocessor 132 to cause the I/O 142 to produce the engine start signal at the third output 114 to cause the engine 14 to receive fuel and/or an ignition signal such that when the engine is rotated by the torque provided by the motor 12 on the third shaft 40, the engine is started.

Advantageously, the gear ratio change may be selected to cause sufficient increased torque generation by the motor 12 to cause the vehicle to continue to accelerate smoothly, or to only experience a similar change in acceleration that would result from a gear shift in absence of starting the engine 14.

Figure 5:
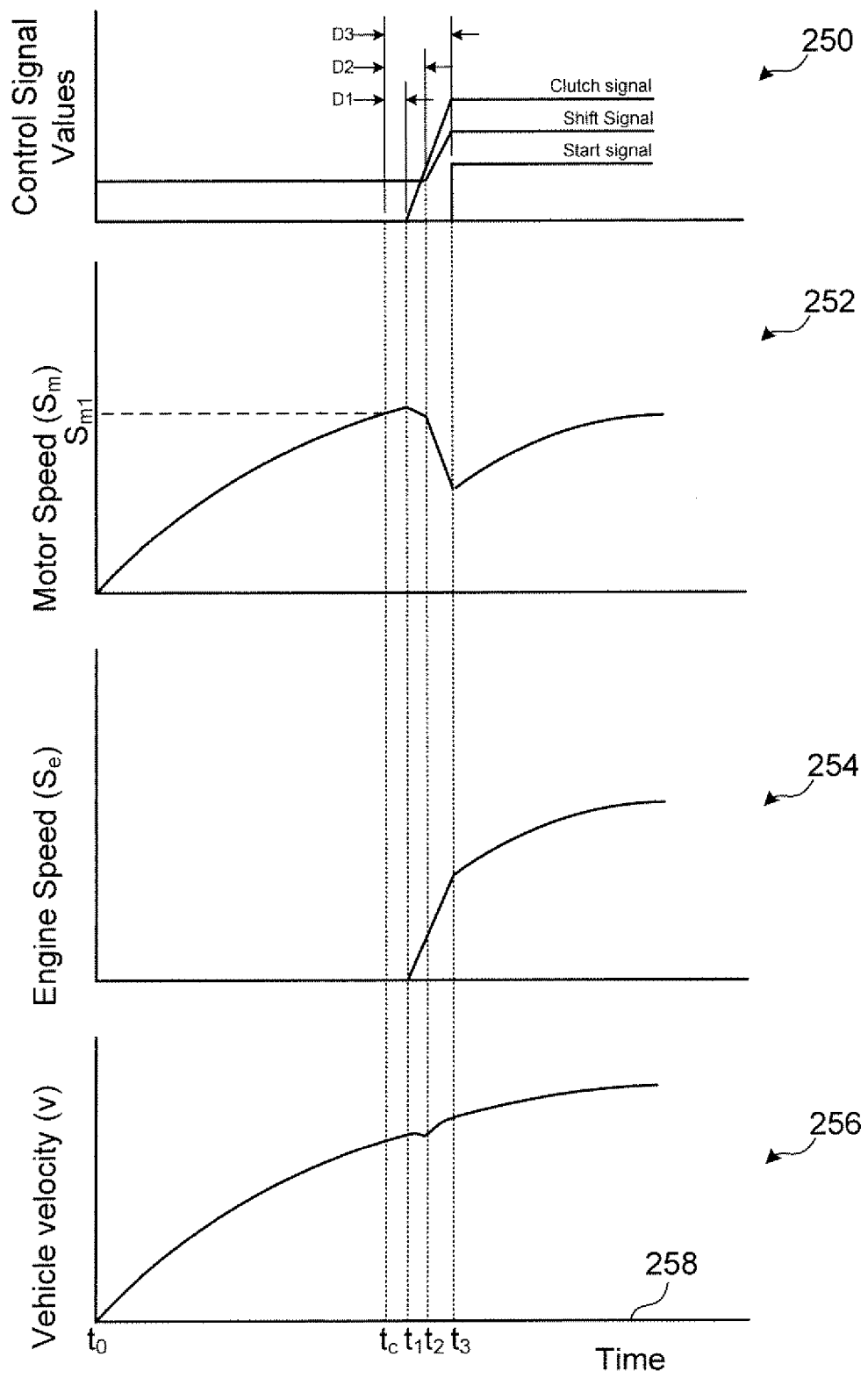
FIG. 5 is a series of graphs of control signals produced by the processor circuit shown in FIG. 3, and a resulting motor speed, engine speed, and vehicle speed.

FIG. 5 shows a series of graphical views illustrating the effect of the delays D1, D2, and D3 shown in blocks 214, 216, and 218. Referring to FIG. 5, a first graph 250 depicts values of the clutch, shift and start control signals vs. time. A second graph 252 depicts motor speed vs. time. A third graph 254 depicts engine speed vs. time. A fourth graph 256 depicts the velocity of the vehicle 80 vs. time. The graphs 250, 252, 254, and 256 share a common time axis 258.

As depicted on the graph 252, the motor speed increases from zero to a rotational speed $S_{m1}$ between time $t_0$ and time $t_c$. As shown on graph 256, the vehicle 80 experiences a corresponding velocity increase between the time $t_0$ and $t_c$.

During the time interval from $t_0$ to $t_c$, the graph 250 shows the shift signal value at first state for configuring the automatic transmission 16 to provide a first gear ratio.

At the time $t_c$, the vehicle operating conditions meet the engine start criteria. At a time $t_1$ (corresponding to a delay time D1 from the time $t_c$), the clutch control signal changes state from a first level, to a second level between the disengaged state and the fully engaged state. While the clutch signal is changing, some slippage of the clutch occurs to cause the engine speed shown in graph 254 to begin to increase.

The motor decelerates between times $t_1$ and $t_2$ as the torque being produced by the motor 12 is mechanically coupled to the engine through the clutch 42, which may result in a slight decrease in vehicle speed as shown on graph 256 between times $t_1$ and $t_2$.

At a time $t_2$ (corresponding to a delay time D2 from the time $t_c$) the shift signal changes state, causing the gear ratio of the transmission 16 to be changed such that the motor speed decreases, as shown in graph 252 between the times $t_2$ and $t_3$, resulting in increased torque generation by the motor 12.

The engine speed shown in graph 254 is at zero (i.e. the engine is stopped) between times $t_0$ and $t_1$. At time $t_1$ the clutch 42 is engaged to mechanically couple the engine 14 to the second shaft 34 and the engine rotational speed begins to increase. However, in this embodiment, the engine start signal is not produced until a time $t_3$, which allows the speed of the engine 14 to be substantially matched to the speed of the motor 12 before starting the engine. Once started (at the time $t_3$) the engine 14 provides torque through the third shaft 40 and the clutch 42 to the second shaft 34, and the vehicle continues accelerating as shown in graph 256.

In the embodiment shown in FIG. 5, the delay times D1, D2, and D3 are generally selected to minimize the effect on vehicle speed as shown in graph 256, where the vehicle speed generally increases steadily, except for a small speed disturbance between times $t_1$ and $t_3$. The delay times D1, D2, and D3 may also be used to account for the latency time between producing the clutch, shift, and engine start signals and the respective actions occurring.

In other embodiments the clutch, shift and start signals may be synchronized to change state simultaneously, such that the offsetting changes are all initiated together.

Advantageously, the electric motor 12 is most efficient when supplying a torque a low rotational speed, while the engine 14 is most efficient at higher rotational speed, and accordingly, when the vehicle 80 is accelerating from a stationary state, or operating at low vehicle velocity, the engine 14 may be inactive (i.e. not started). Advantageously, the engine 14 is only started when the vehicle operation meets the operating criterion at the time $t_c$, thus minimizing fuel consumption when operating the vehicle at low velocity or under start/stop driving conditions. Furthermore, by causing a transmission gear change while mechanically coupling the engine 14 to the motor 12, significant changes in vehicle acceleration when starting the engine are prevented.

While specific embodiments of the invention have been described and illustrated, such embodiments should be considered illustrative of the invention only and not as limiting the invention as construed in accordance with the accompanying claims.

What is claimed is:

1. A method for starting an engine in a hybrid vehicle, comprising:
   generating a first control signal to be communicated to a clutch of the hybrid vehicle, the first control signal operable to cause the clutch to couple an engine of the hybrid vehicle to an electric motor of the hybrid vehicle such that a load is applied to the electric motor, the load causing:
   the electric motor to decelerate to a reduced rotational speed over a motor deceleration time period; and
   a starting torque to be supplied to the engine for starting the engine; and
   generating, during the motor deceleration time period, a second control signal to be communicated to an automatic transmission of the hybrid vehicle, the second control signal operable to cause the automatic transmission to shift to a target gear ratio selected such that a driving torque supplied by the electric motor at the reduced rotational speed during the motor deceleration time period is sufficient to maintain a desired acceleration of the hybrid vehicle.

2. The method of claim 1, wherein the first control signal is generated in response to a determination that an operating condition of the hybrid vehicle meets a criterion for starting the engine.

3. The method of claim 2, wherein the second control signal is generated in response to the determination that the operating condition of the hybrid vehicle meets the criterion for starting the engine.

4. The method of claim 2, wherein the determination that an operating condition of the hybrid vehicle meets the criterion for starting the engine comprises at least one of:
   a determination that the rotational speed of the electric motor reaches a reference speed;
   a determination that the hybrid vehicle reaches a reference velocity;
   a determination that a storage element for supplying electrical energy to the electric motor reaches a reference minimum state of charge; and
   a determination that a voltage at which electrical energy supplied to the electric motor reaches a reference minimum level.

5. The method of claim 2, wherein:
   the first control signal is generated a first time period after the operating condition of the hybrid vehicle meets the criterion for starting the engine; and
   the second control signal is generated a second time period after the operating condition of the hybrid vehicle meets the criterion for starting the engine.

6. The method of claim 5, wherein the first and second time periods are selected such that a substantially constant acceleration of the hybrid vehicle is maintained while starting the engine.

7. The method of claim 2, further comprising generating an engine start signal in response to the operating condition of the hybrid vehicle meeting the criterion for starting the engine.

8. The method of claim 7, wherein the engine start signal comprises at least one of:
   an ignition signal for controlling ignition of the engine; or
   a fuel control signal for causing fuel to be supplied to the engine.

9. The method of claim 8, wherein the engine start signal is generated a third time period after the operating condition of the hybrid vehicle meets the criterion for starting the engine, the third time period being selected such that the engine is allowed sufficient time to reach a rotational speed corresponding to the rotational speed of the electric motor.

10. The method of claim 1, wherein the first control signal is operable to cause the clutch to couple the engine to the electric motor by causing the clutch to move from a disengaged state to an engaged state, the clutch being located between the engine and the electric motor.

11. The method of claim 10, wherein the first control signal comprises a time-varying amplitude representing a desired amount of engagement of the clutch between the disengaged state and the engaged state in order to control an amount of slippage of the clutch when coupling the engine to the electric motor.

12. The method of claim 1, wherein:
the second control signal is operable to cause the automatic transmission to shift to the target gear ratio from a previous gear ratio; and
the target gear ratio is higher than the previous gear ratio.

13. An apparatus for starting an engine in a hybrid vehicle, comprising:
a controller configured to communicate with a clutch and an automatic transmission of the hybrid vehicle, the controller operable to:
generate a first control signal to be communicated to the clutch, the first control signal operable to cause the clutch to couple the engine of the hybrid vehicle to an electric motor of the hybrid vehicle such that a load is applied to the electric motor, the load causing:
the electric motor to decelerate to a reduced rotational speed over a motor deceleration time period; and
a starting torque to be supplied to the engine for starting the engine; and generate, during the motor deceleration time period, a second control signal to be communicated to the automatic transmission of the hybrid vehicle, the second control signal operable to cause the automatic transmission to shift to a target gear ratio selected such that a driving torque supplied by the electric motor at the reduced rotational speed during the motor deceleration time period is sufficient to maintain a desired acceleration of the hybrid vehicle.

14. The apparatus of claim 13, wherein the first control signal is generated in response to a determination that an operating condition of the hybrid vehicle meets a criterion for starting the engine.

15. The apparatus of claim 14, wherein the second control signal is generated in response to the determination that the operating condition of the hybrid vehicle meets the criterion for starting the engine.

16. The apparatus of claim 14, wherein the determination that an operating condition of the hybrid vehicle meets the criterion for starting the engine comprises at least one of:
a determination that the rotational speed of the electric motor reaches a reference speed;
a determination that the hybrid vehicle reaches a reference velocity;
a determination that a storage element for supplying electrical energy to the electric motor reaches a reference minimum state of charge; and
a determination that a voltage at which electrical energy supplied to the electric motor reaches a reference minimum level.

17. The apparatus of claim 14, wherein:
the first control signal is generated a first time period after the operating condition of the hybrid vehicle meets the criterion for starting the engine; and
the second control signal is generated a second time period after the operating condition of the hybrid vehicle meets the criterion for starting the engine.

18. The apparatus of claim 17, wherein the first and second time periods are selected such that a substantially constant acceleration of the hybrid vehicle is maintained while starting the engine.

19. The apparatus of claim 14, wherein the controller is further operable to generate an engine start signal in response to the operating condition of the hybrid vehicle meeting the criterion for starting the engine.

20. The apparatus of claim 19, wherein the engine start signal comprises at least one of:
an ignition signal for controlling ignition of the engine; or
a fuel control signal for causing fuel to be supplied to the engine.

21. The apparatus of claim 20, wherein the engine start signal is generated a third time period after the operating condition of the hybrid vehicle meets the criterion for starting the engine, the third time period being selected such that the engine is allowed sufficient time to reach a rotational speed corresponding to the rotational speed of the electric motor.

22. The apparatus of claim 13, wherein the first control signal is operable to cause the clutch to couple the engine to the electric motor by causing the clutch to move from a disengaged state to an engaged state, the clutch being located between the engine and the electric motor.

23. The apparatus of claim 22, wherein the first control signal comprises a time-varying amplitude representing a desired amount of engagement of the clutch between the disengaged state and the engaged state in order to control an amount of slippage of the clutch when coupling the engine to the electric motor.

24. The apparatus of claim 13, wherein:
the second control signal is operable to cause the automatic transmission to shift to the target gear ratio from a previous gear ratio; and
the target gear ratio is higher than the previous gear ratio.

25. A hybrid vehicle, comprising:
an engine;
an electric motor;
a clutch located between the engine and the electric motor;
an automatic transmission; and
a controller configured to communicate with the clutch and the automatic transmission, the controller operable to:
generate a first control signal to be communicated to the clutch, the first control signal operable to cause the clutch to couple the engine to the electric motor such that a load is applied to the electric motor, the load causing:
the electric motor to decelerate to a reduced rotational speed over a motor deceleration time period; and
a starting torque to be supplied to the engine for starting the engine; and
generate, during the motor deceleration time period, a second control signal to be communicated to the automatic transmission, the second control signal operable to cause the automatic transmission to shift to a target gear ratio selected such that a driving torque supplied by the electric motor at the reduced rotational speed during the motor deceleration time period is sufficient to maintain a desired acceleration of the hybrid vehicle.

26. The hybrid vehicle of claim 25, wherein the first control signal is generated in response to a determination that an operating condition of the hybrid vehicle meets a criterion for starting the engine.

27. The hybrid vehicle of claim 26, wherein the second control signal is generated in response to a determination that the operating condition of the hybrid vehicle meets the criterion for starting the engine.

28. The hybrid vehicle of claim 26, wherein the determination that an operating condition of the hybrid vehicle meets the criterion for starting the engine comprises at least one of:
a determination that the rotational speed of the electric motor reaches a reference speed;
a determination that the hybrid vehicle reaches a reference velocity;

a determination that a storage element for supplying electrical energy to the electric motor reaches a reference minimum state of charge; and a determination that a voltage at which electrical energy supplied to the electric motor reaches a reference minimum level.

29. The hybrid vehicle of claim 26, wherein:
the first control signal is generated a first time period after the operating condition of the hybrid vehicle meets the criterion for starting the engine; and
the second control signal is generated a second time period after the operating condition of the hybrid vehicle meets the criterion for starting the engine.

30. The hybrid vehicle of claim 29, wherein the first and second time periods are selected such that a substantially constant acceleration of the hybrid vehicle is maintained while starting the engine.

31. The hybrid vehicle of claim 26, wherein the controller is further operable to generate an engine start signal in response to the operating condition of the hybrid vehicle meeting the criterion for starting the engine.

32. The hybrid vehicle of claim 31, wherein the engine start signal comprises at least one of:

an ignition signal for controlling ignition of the engine; or
fuel control signal for causing fuel to be supplied to the engine.

33. The hybrid vehicle of claim 32, wherein the engine start signal is generated a third time period after the operating condition of the hybrid vehicle meets the criterion for starting the engine, the third time period being selected such that the engine is allowed sufficient time to reach a rotational speed corresponding to the rotational speed of the electric motor.

34. The hybrid vehicle of claim 25, wherein the first control signal comprises a time-varying amplitude representing a desired amount of engagement of the clutch between the disengaged state and the engaged state in order to control an amount of slippage of the clutch when coupling the engine to the electric motor.

35. The hybrid vehicle of claim 25, wherein:
the second control signal is operable to cause the automatic transmission to shift to the target gear ratio from a previous gear ratio; and
the target gear ratio is higher than the previous gear ratio.

* * * * *